(12) United States Patent
Zenger et al.

(10) Patent No.: US 11,132,501 B2
(45) Date of Patent: Sep. 28, 2021

(54) SMART COLUMN SELECTION FOR TABLE OPERATIONS IN DATA PREPARATION

(71) Applicant: salesforce.com, inc., San Francisco, CA (US)

(72) Inventors: Brittany Zenger, Coquitlam (CA); Sybil Shim, Vancouver (CA); Daniel Scott Perry, New Westiminster, CA (US); Yi Zhao Liu, Vancouver (CA)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 15/989,982

(22) Filed: May 25, 2018

(65) Prior Publication Data

US 2019/0361971 A1 Nov. 28, 2019

(51) Int. Cl.
*G06F 40/177* (2020.01)
*G06F 16/28* (2019.01)
*G06F 16/22* (2019.01)

(52) U.S. Cl.
CPC ........ *G06F 40/177* (2020.01); *G06F 16/2282* (2019.01); *G06F 16/288* (2019.01)

(58) Field of Classification Search
CPC ..................................................... G06F 17/24
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |

(Continued)

*Primary Examiner* — James J Debrow
(74) *Attorney, Agent, or Firm* — LKGlobal Lorenz & Kopf, LLP

(57) ABSTRACT

A computer implemented method of providing suggestions of related columns for a table operation in a data management system is provided. In one embodiment, the method includes storing, by a processor, a table having a plurality of rows and a plurality of columns, metadata associated with the plurality of columns, and data stored within the plurality of rows and the plurality of columns; receiving, by a processor, a table operation selected by a system or user; processing, by a processor, at least one of the data stored in the plurality of columns and the metadata associated with plurality columns based on a type of the selected table operation to determine at least one relationship between at least two columns of the plurality of columns; and generating, by the processor, dialog data that presents the at least one relationship between the at least two columns to a system or user for use in the table operation.

16 Claims, 7 Drawing Sheets

(56) References Cited

U.S. PATENT DOCUMENTS

| | | |
|---|---|---|
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050030 A1* | 3/2005 | Gudbjartsson et al. ............. G06F 17/00 |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2006/0212469 A1* | 9/2006 | Babanov et al. ......... G06F 7/00 |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2009/0271711 A1* | 10/2009 | Hartshorn et al. ...... G06F 3/048 |
| 2011/0173164 A1* | 7/2011 | Bendel et al. .......... G06F 17/30 |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2012/0278321 A1* | 11/2012 | Traub et al. ............ G06F 17/30 |
| 2013/0124957 A1* | 5/2013 | Oppenheimer et al. ............. G06F 17/00 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2016/0371275 A1* | 12/2016 | Bernstein et al. ...... G06F 17/30 |
| 2018/0157990 A1* | 6/2018 | Allen et al. ............ G06N 99/00 |
| 2018/0349338 A1* | 12/2018 | Cheung et al. ......... G06F 17/24 |
| 2019/0095817 A1* | 3/2019 | Ma et al. .......... G06F 17/30864 |

* cited by examiner

SMART COLUMN SELECTION FOR TABLE OPERATIONS IN DATA PREPARATION

TECHNICAL FIELD

Embodiments of the subject matter described herein relate generally to data management systems, and more particularly to techniques for automating suggestions for table operations in a data management system.

BACKGROUND

Data management systems store data for processing. In some instances the data can be stored as a table having rows and columns. Data management systems process the stored data based on certain defined table operations. For example, a pivot operation creates a pivot table. A pivot table is a table that summarizes data from another table or presents the data from another table in a new way. For example, a pivot table can be generated by applying an operation such as sorting, averaging, summing, joining, etc. to data in the first table. In some instances, the operations are performed on data from multiple columns of the first table. In such instances, a user manually selects which columns to perform the operations on based on a listing of the column header. Such manual selection must also be performed for table operations other than the pivot operation. It would be desirable to automatically suggest related columns to aid in the selection process for a table operation. It would be further desirable to automatically suggest table operations that can be performed on columns determined to be related.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Disclosed herein are systems and methods for processing data stored by a data management system. More particularly, the subject matter described herein discloses apparatus, systems, techniques and articles for processing data of a table in a data management system to automatically provide suggestions of related columns for performing table operations. The subject matter described herein further discloses apparatus, systems, techniques and articles for processing data of a table in a data management system to automatically provide suggestions of table operations that can be performed on related columns. The disclosure provides many different embodiments, or examples, for implementing different features of the provided subject matter. The following detailed description is merely exemplary in nature and is not intended to limit the invention or the application and uses of the invention. Furthermore, there is no intention to be bound by any theory presented in the preceding background or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
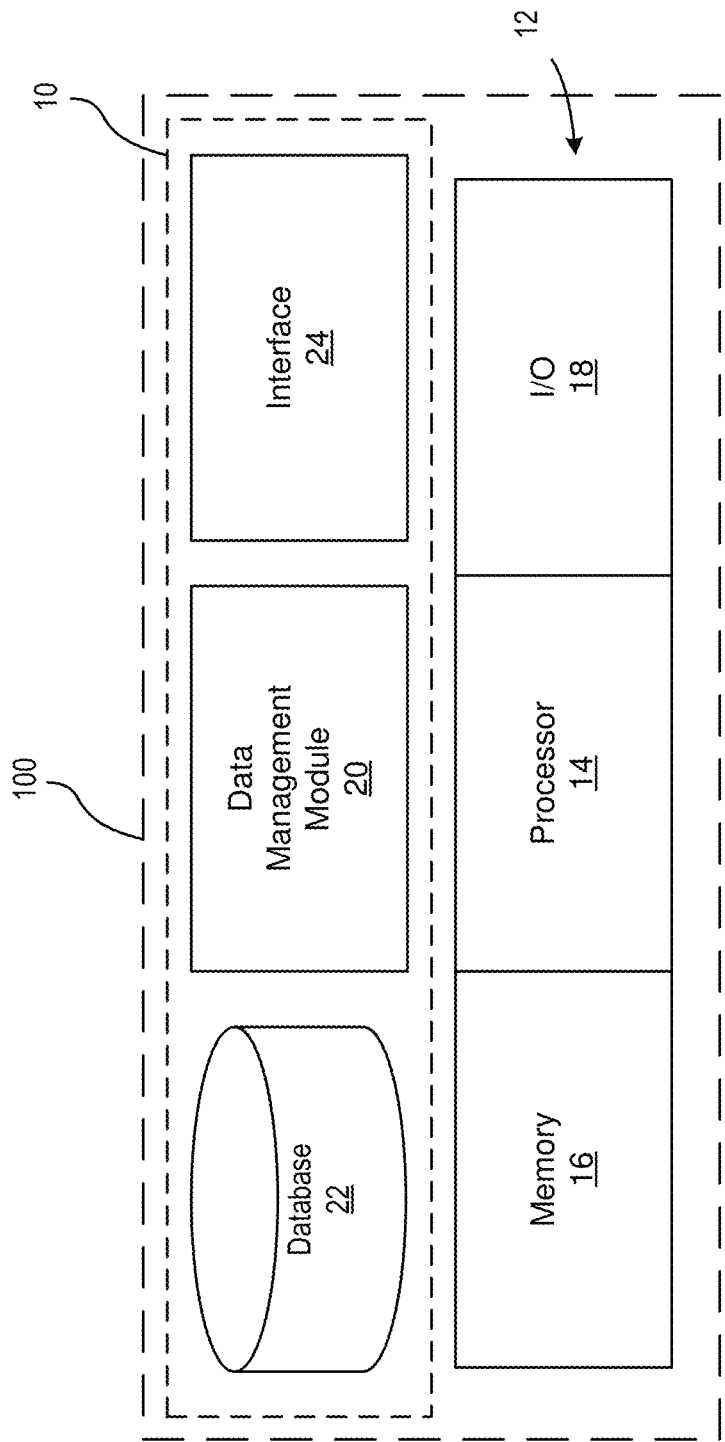
FIG. 1 is a block diagram of an example data management system that may be implemented in the context of a computing environment, in accordance with various embodiments.

Turning now to the figures where a data management system 10 is shown and described in accordance with various embodiments. With particular reference to FIG. 1, in various embodiments, the exemplary data management system 10 may be implemented in the context of a computing environment 100. The computing environment 100 operates with any sort of conventional processing hardware 12, such as a processor 14, memory 16, input/output features 18 and the like. The input/output features 18 generally represent the interface(s) to networks (e.g., to a network, or any other local area, wide area or other network), mass storage, display devices, data entry devices and/or the like. The processor 14 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 16 represents any non-transitory short or long term storage or other computer-readable media capable of storing programming instructions for execution on the processor 14, including any sort of random access memory (RAM), read only memory (ROM), flash memory, magnetic or optical mass storage, and/or the like. The computer-executable programming instructions, when read and executed by the processor 14, cause the processor 14 to create, generate, or otherwise facilitate tasks, operations, functions, and/or processes described herein. It should be noted that the memory 16 represents one suitable implementation of such computer-readable media, and alternatively or additionally, the processor 14 could receive and cooperate with external computer-readable media that is realized as a portable or mobile component or application platform, e.g., a portable hard drive, a USB flash drive, an optical disc, or the like.

The data management system 10 is shown to include a data management module 20 that interfaces with a database 22 that stores data. In various embodiments, the data is stored in a table format with a plurality of rows and columns. In various embodiments, the data management module 20 manages and displays certain data from the database 22 in an interface 24. The interface may display the table data according to the table format or some other format. In various embodiments, the data management module 20 further provides for methods, systems, and techniques for processing the stored data and any metadata in order to find related columns of data and to generate suggestions in an automated manner. In various embodiments, the suggestions are related to a pivot operation of the table and/or other table operations.

Figure 2:
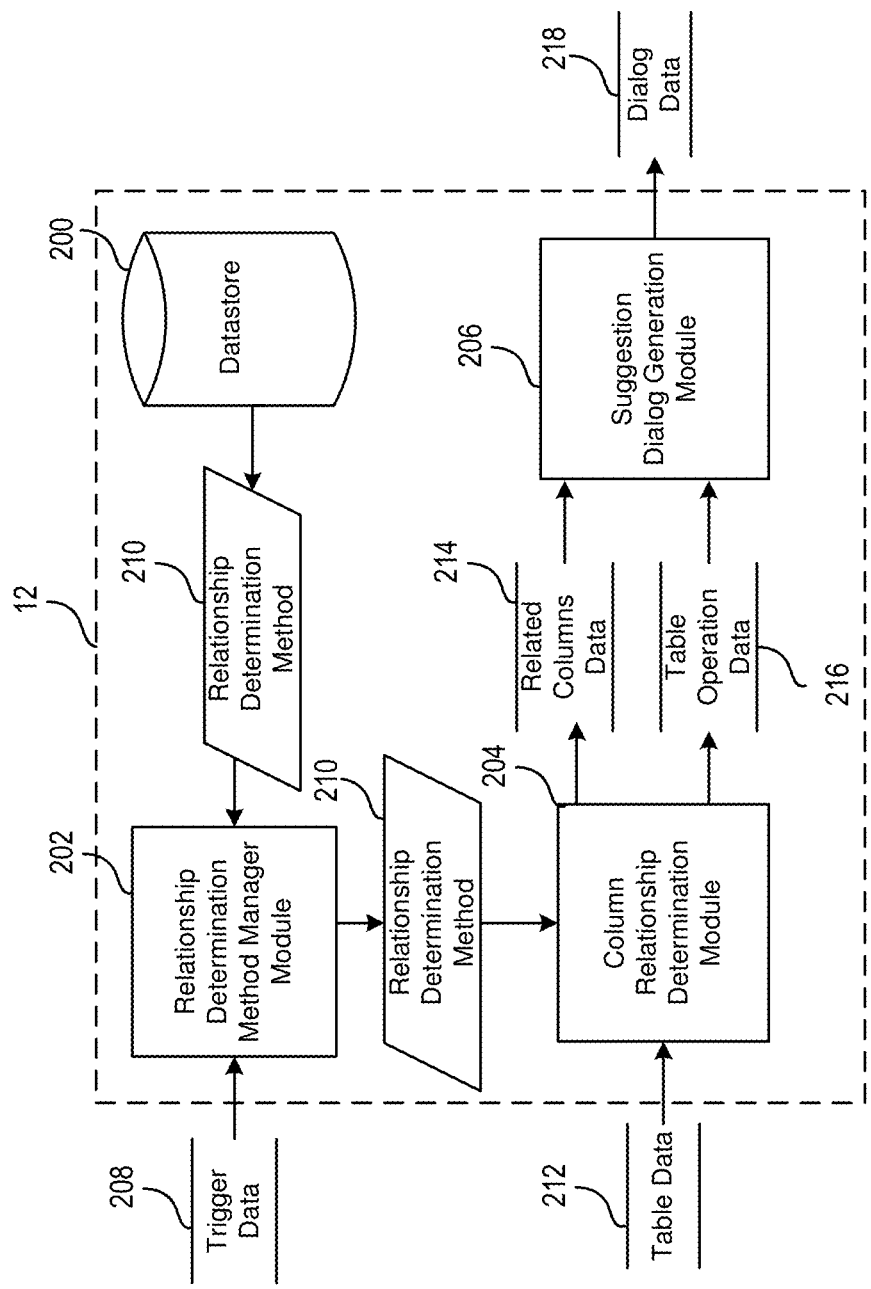
FIG. 2 is a dataflow diagram depicting an example system of the data management system for providing suggestions of related columns, in accordance with various embodiments.

With reference now to FIG. 2, a dataflow diagram depicts a portion of an exemplary data management system 10 for automatically providing suggestions of related columns for table operations, and/or suggestions of table operations for related columns of the data management system 10. As can be appreciated, various exemplary embodiments of the data management system 10, according to the present disclosure, may include any number of modules and/or sub-modules. In various exemplary embodiments, the modules and sub-modules shown in FIG. 2 may be combined and/or further partitioned to similarly provide the suggestions in an automated manner. In various embodiments, the data management system 10 includes a first datastore 200, a relationship determination method manager module 202, a column relationship determination module 204, and a suggestions dialog generation module 206.

The first datastore 200 stores various methods 210 for processing column metadata and/or column data of a table to determine relationships between the columns of the table. In various embodiments, the relationship determination methods (hereinafter referred to as methods 210) are rule-based methods that make use of predefined rule sets or that make use of automatic rule inference (e.g., machine learning methods). In various embodiments, the methods 210 generate a similarity score between each column and all of the other columns.

In various embodiments, the methods 210 are defined based on a type of table operation to be performed. For example, certain methods 210 are defined for when a pivot operation is selected or recommended, certain other methods 210 are defined for when a join or merge operation is selected or recommended, certain other methods 210 are defined for when an append operation is selected or recommended, and so on. In various other embodiments, the methods 210 are not defined based on a type of the table operation rather are defined for any potential table operation.

In various embodiments, the methods 210 process the metadata associated with the columns of the table to determine if relationships exist. The metadata can include, for example, but is not limited to, a name of each column, a type of data within each column, a size of each column, etc. When processing the names of the columns, for example, a method 210 may evaluate the names for similarities. For instance, historical sales data may be contained in columns named "2016-Q1", "2016-Q2" and so on. By using a pattern matching technique such as a regex pattern matcher (e.g., a multi-level pattern matcher to build an alphanumeric pattern+symbols), majority patterns can be identified which might indicate relationships between columns. In the provided example, all columns similar to the pattern "2016-Q1" would be determined to be related.

In addition to processing the names or as an alternative to processing the names, the method 210 may evaluate the type (measure) of the column data for similarities. For example, the data type and/or format (e.g., a string of characters, a date, a number, etc.) of each column is compared for similarities. Columns having the same or similar data types would be determined to be related and columns having dissimilar data types would then be removed from the related list or ignored.

In addition to processing the names and/or the type or as an alternative to processing the names and/or the type, the method 210 may evaluate the size of each column (number of cells or fields in the column) for similarities. For example, table operations, such as pivot operations, of smaller size are less likely to be valuable to users versus potentially large numbers of columns that all share similar characteristics. Selecting columns having a largest reasonable set as related provides a way to present a best possible solution to the users.

In various embodiments, in addition to processing the metadata or as alternative to processing the metadata, the methods 210 process the column data itself to determine the relationships. The column data can be evaluated based on a range of characteristics, such as, but not limited to, average, median, min-max, data histogram, frequent values, and data completeness. The data characteristics of potential matching fields can be compared and clustered to increase the likelihood score of related columns.

The relationship determination method manager module 202 receives as input trigger data 208. The trigger data 208 triggers the analysis of the table to determine the suggestions of related columns. In various embodiments, the trigger data 208 indicates a selection of a particular table operation for which a suggestion is requested. For example, the selection of a particular table operation may be initiated by a user, a system, or be scheduled automatically as a feature of an application, and the trigger data 208 is generated based on the selection. The relationship determination method manager module 202 retrieves the relationship determination method 210 from the datastore 200 based on the selected table operation and/or the request for a smart suggestion.

In various other embodiments, the trigger data 208 indicates a request for suggestions of related columns as well as a suggestion of a table operation that can be performed on the related columns (referred to herein as a smart suggestion). For example, the request for a smart suggestion may be initiated by a user, a system, or be scheduled automatically as a feature of an application, and the trigger data 208 is generated based on the request. The relationship determination method manager module 202 retrieves the relationship determination method 210 from the datastore 200 based on the request for a smart suggestion.

Figure 3:
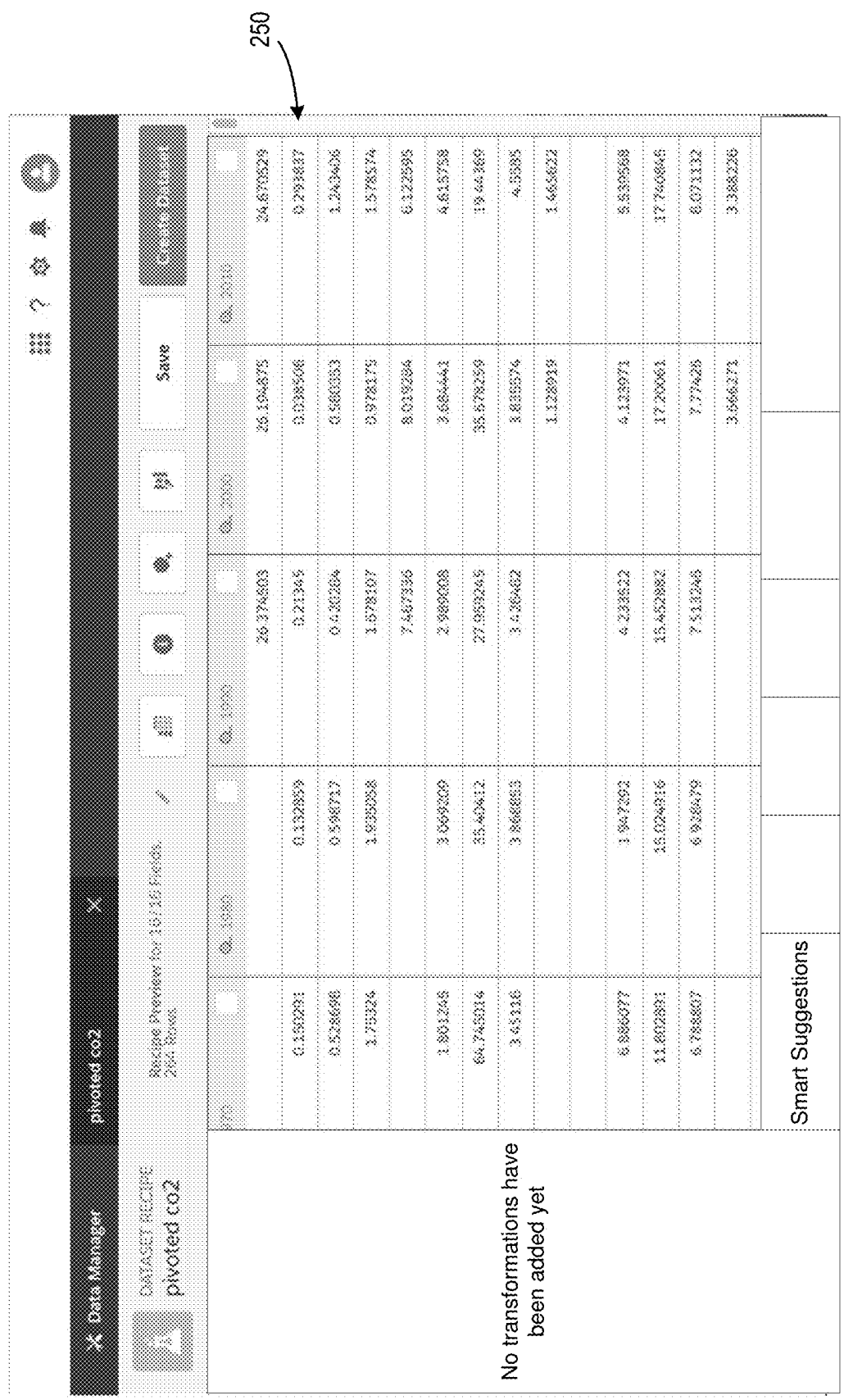
FIGS. 3, 4, and 5 are illustrations of example tables, table operations, and suggestions that may be produced by the data management system, in accordance with various embodiments.

The column relationship determination module 204 receives as input an indication of the relationship determination method 210 and table data 212. For example, as shown in the example of FIG. 3, the table data 212 includes metadata associated with the rows and columns of the table and data 250 stored in the table. Other metadata (not shown) may be associated with the data 250 and may be a part of the table data 212. The column relationship determination module 204 processes the indicated relationship determination method 210 with the table data 212 to determine any related columns for the table operation. For example, the column relationship determination module 204 runs the relationship determination method 210 on the table data 212 in order to determine relationship scores between two columns in the table. The column relationship determination module 204 then compares the scores to a threshold value (e.g., a predefined value) to determine which columns are related. For example, when the relationship score is greater than the defined threshold, the column relationship determination module 204 deems the two columns as related.

With reference back to FIG. 2, the column relationship determination module 204 generates related columns data 214 based on the determined related columns. For example, the related columns data 214 can include the column header of each of the determined related columns. When the relationship determination method 210 is associated with a request for a smart suggestion, the column relationship determination module 204 generates table operation data 216 based on determined operations that can be performed on the related columns.

Figure 4:
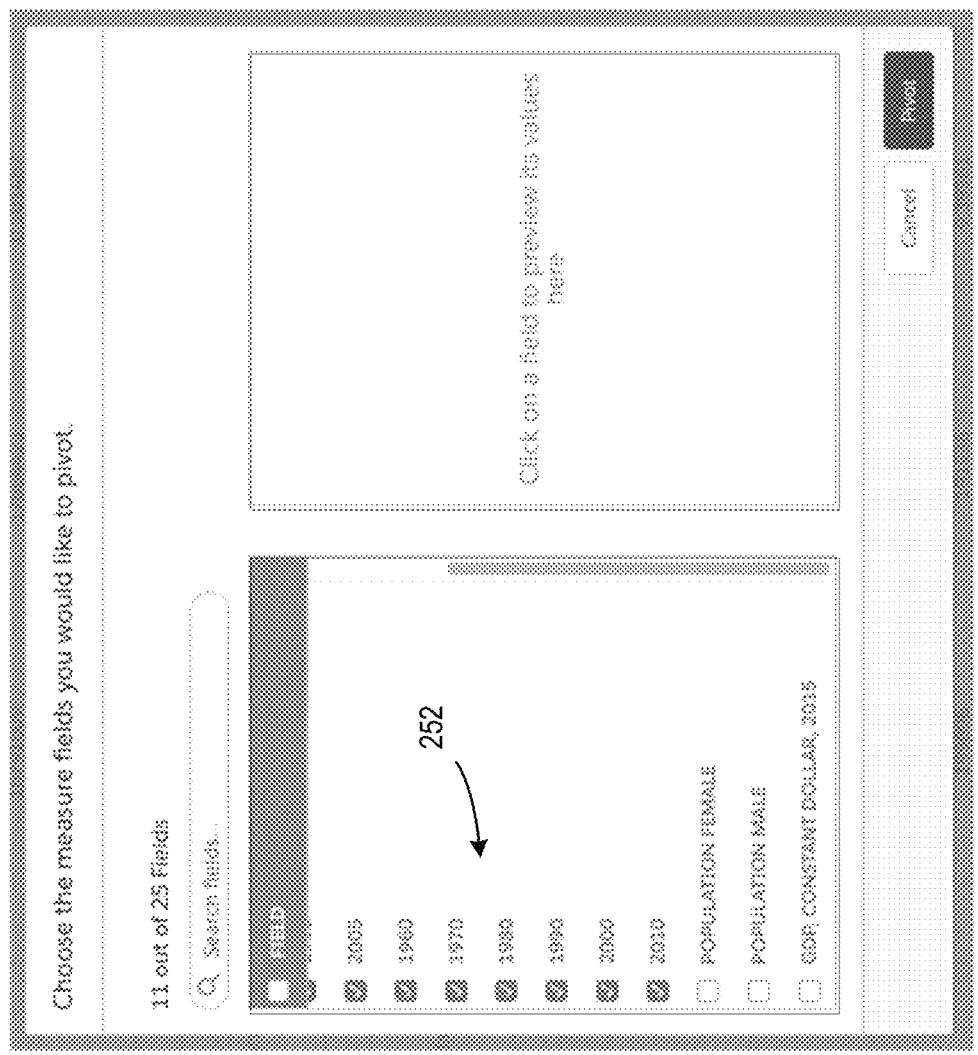

The suggestions dialog generation module 206 receives as input the related columns data 214 and the table operation data 216. The suggestions dialog generation module 206 generates dialog data 218 for generating a dialog box that suggests the related columns as columns to be used in the table operation and/or that suggests the table operation to be performed on the related columns. For example, as shown in FIG. 4, the dialog data 218 identifies the related columns by preselecting (e.g., by way of a radio button, check box, or other method of selection) the related column names from a listing of column names 250 presented in a dialog box. As can be appreciated, other forms of suggestions can be implemented in various embodiments.

Figure 5:
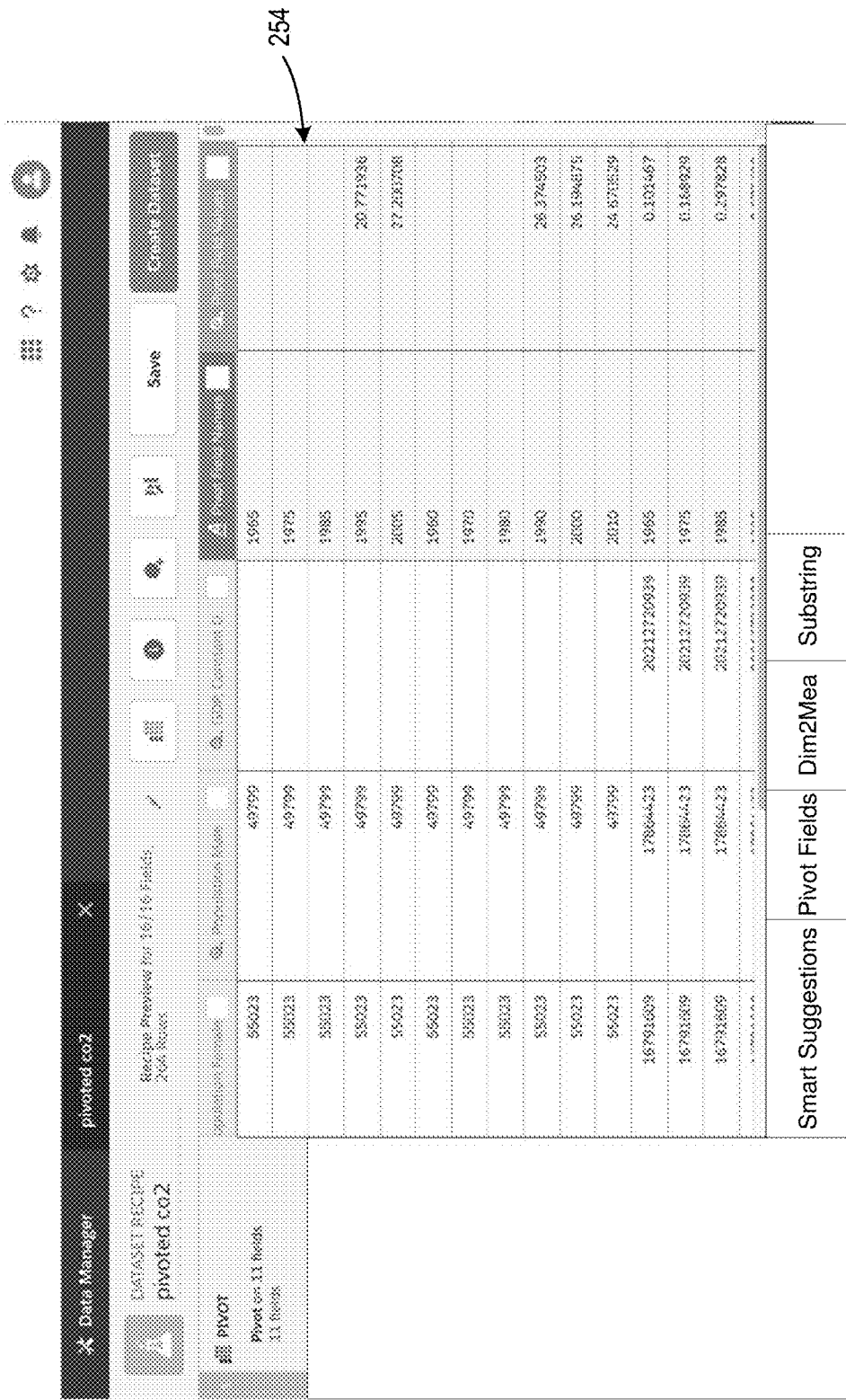

As shown in FIG. 5, once the related columns are confirmed the table operation is performed (pivot operation in this example) and the data 250 is displayed (Pivot fields, substring, Dim2Mea in this example). Additionally or alternatively, the smart suggestions for other table operations are displayed for user selection.

Figure 6:
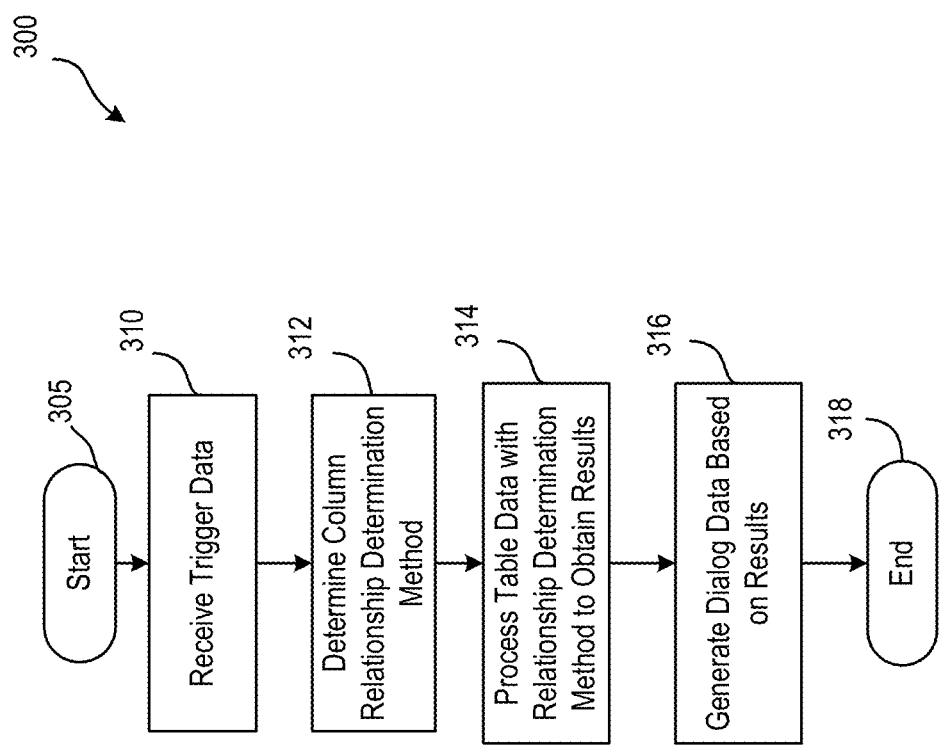
FIG. 6 is a process flowchart depicting an example process that may be performed by the data management system for providing suggestions of related columns, in accordance with various embodiments.

With reference now to FIG. 6 and with continued reference to FIGS. 1 and 2, a process flow chart depicts an example process 300 for providing suggestions of related columns in a data management system. As can be appreciated in light of the disclosure, the order of operations performed by the process 300 is not limited to the sequential execution as illustrated in FIG. 6, but may be performed in one or more varying orders as applicable and in accordance with the present disclosure. In various embodiments, the process 300 can be scheduled to run based on one or more predetermined events (selection of a table operation or request for a smart suggestion) or run automatically based on an occurrence of one or more events in the data management system. This example process 300 (and other processes described herein) may be implemented at least partially with a multi-tenant database system a, e.g., by one or more processors configured to receive or retrieve information, process the information, store results, and transmit the results. This example process 300 may also be implemented at least partially with a single tenant database system.

In various embodiments, the process may begin at 305. At operation 310, the trigger data 208 is received. The column relationship determination method 210 is determined at 312, for example, as discussed above. The table data 212 is processed according to the column relationship determination method 210, for example, as discussed above to determine similarity scores, and the similarity scores are compared to a defined threshold in order to determine related columns at 314. The dialog data 218 is then generated at 316 based on the related columns at 316. Thereafter, the process 300 may end at 318 or continue with other processing.

Figure 7:
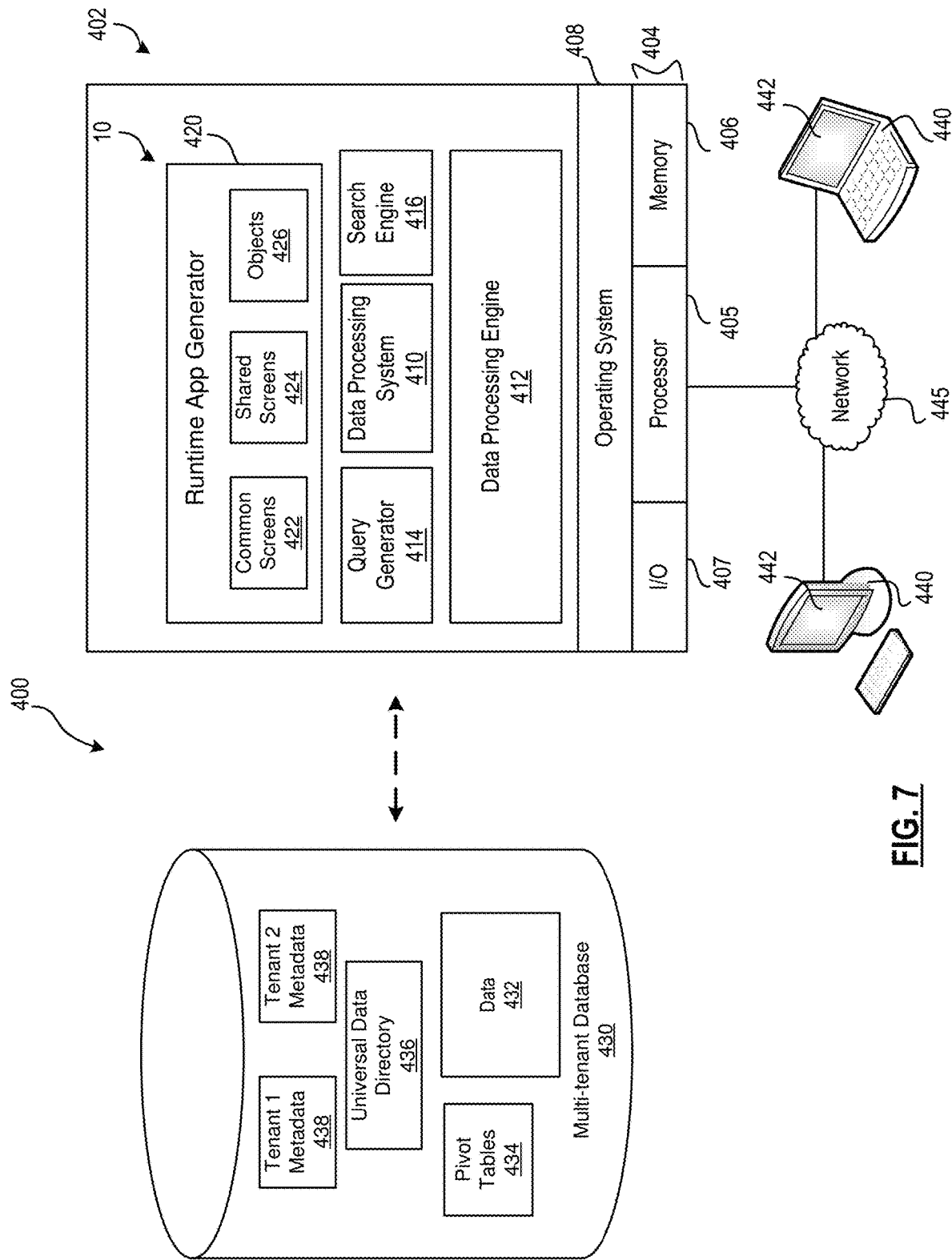
FIG. 7 is a block diagram of the example data management system that may be implemented in the context of a multi-tenant system as the computing environment, in accordance with various embodiments.

With particular reference to FIG. 7, in various embodiments, the exemplary data management system 10 may be implemented in the context of a multi-tenant system 400. As can be appreciated, the data management system 10 may be implemented in other systems such as a single tenant system or a personal computing system and is not limited to the present example. For exemplary purposes, the data management system 10 will be discussed hereinafter in the context of the multi-tenant system 400.

The example multi-tenant system 400 of FIG. 7 includes a server 402 that dynamically creates and supports virtual applications 428 based upon data 432 from a common database 430 that is shared between multiple tenants, alternatively referred to herein as a multi-tenant database. Data and services generated by the virtual applications 428 are provided via a network 445 to any number of client devices 440, as desired. Each virtual application 428 is suitably generated at run-time (or on-demand) using a common application platform 410 that securely provides access to the data 432 in the database 430 for each of the various tenants subscribing to the multi-tenant system 400.

As used herein, a "tenant" or an "organization" should be understood as referring to a group of one or more users or entities that shares access to common subset of the data within the multi-tenant database 430. In this regard, each tenant includes one or more users associated with, assigned to, or otherwise belonging to that respective tenant. To put it another way, each respective user within the multi-tenant system 400 is associated with, assigned to, or otherwise belongs to a particular tenant of the plurality of tenants supported by the multi-tenant system 400. Tenants may represent customers, customer departments, business or legal organizations, and/or any other entities that maintain data for particular sets of users within the multi-tenant system 400 (i.e., in the multi-tenant database 430). For example, the application server 402 may be associated with one or more tenants supported by the multi-tenant system 400. Although multiple tenants may share access to the server 402 and the database 430, the particular data and services provided from the server 402 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 432 belonging to or otherwise associated with other tenants.

In various embodiments, the server 402 is implemented using one or more actual and/or virtual computing systems that collectively provide the dynamic application platform 410 for generating the virtual applications 428. For example, the server 402 may be implemented using a cluster of actual and/or virtual servers operating in conjunction with each other, typically in association with conventional network communications, cluster management, load balancing and other features as appropriate. The server 402 operates with any sort of conventional processing hardware 404, such as a processor 405, memory 406, input/output features 407 and the like. The input/output features 407 generally represent the interface(s) to networks (e.g., to the network 445, or any other local area, wide area or other network), mass storage, display devices, data entry devices and/or the like. The processor 405 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 406 represents any non-transitory short or long term storage or other computer-readable media capable of storing programming instructions for execution on the processor 405, including any sort of random access memory (RAM), read only memory (ROM), flash memory, magnetic or optical mass storage, and/or the like. The computer-executable programming instructions, when read and executed by the server 402 and/or processor 405, cause the server 402 and/or processor 405 to create, generate, or otherwise facilitate the application platform 410 and/or virtual applications 428 and perform one or more additional tasks, operations, functions, and/or processes described herein. It should be noted that the memory 106 represents one suitable implementation of such computer-readable media, and alternatively or additionally, the server 402 could receive and cooperate with external computer-readable media that is realized as a portable or mobile component or application platform, e.g., a portable hard drive, a USB flash drive, an optical disc, or the like.

The application platform 410 is any sort of software application or other data processing engine that generates the virtual applications 428 that provide data and/or services to the client devices 440. In a typical embodiment, the application platform 410 gains access to processing resources, communications interfaces and other features of the processing hardware 104 using any sort of conventional or proprietary operating system 408. The virtual applications 128 are typically generated at run-time in response to input received from the client devices 440. For the illustrated embodiment, the application platform 410 includes a bulk data processing engine 412, a query generator 414, a search engine 416 that provides text indexing and other search functionality, and a runtime application generator 420. Each of these features may be implemented as a separate process or other module, and many equivalent embodiments could include different and/or additional features, components or other modules as desired.

The runtime application generator 420 dynamically builds and executes the virtual applications 428 in response to specific requests received from the client devices 440. The virtual applications 428 are typically constructed in accordance with the tenant-specific metadata 438, which describes the particular tables, reports, interfaces and/or other features of the particular application 428. In various embodiments, each virtual application 428 generates dynamic web content that can be served to a browser or other client program 442 associated with its client device 440, as appropriate.

The runtime application generator 420 suitably interacts with the query generator 414 to efficiently obtain multi-tenant data 432 from the database 430 as needed in response to input queries initiated or otherwise provided by users of the client devices 440. In a typical embodiment, the query generator 414 considers the identity of the user requesting a particular function (along with the user's associated tenant), and then builds and executes queries to the database 430 using system-wide metadata 436, tenant specific metadata 438, pivot tables 434, and/or any other available resources. The query generator 414 in this example therefore maintains security of the common database 430 by ensuring that queries are consistent with access privileges granted to the user and/or tenant that initiated the request. In this manner, the query generator 414 suitably obtains requested subsets of data 432 accessible to a user and/or tenant from the database 430 as needed to populate the tables, reports or other features of the particular virtual application 428 for that user and/or tenant.

Still referring to FIG. 7, the data processing engine 412 performs bulk processing operations on the data 432 such as uploads or downloads, updates, online transaction processing, and/or the like. In many embodiments, less urgent bulk processing of the data 432 can be scheduled to occur as processing resources become available, thereby giving priority to more urgent data processing by the query generator 414, the search engine 416, the virtual applications 428, etc.

In exemplary embodiments, the application platform 410 is utilized to create and/or generate data-driven virtual applications 428 for the tenants that they support. Such virtual applications 428 may make use of interface features such as custom (or tenant-specific) screens 424, standard (or universal) screens 422 or the like. Any number of custom and/or standard objects 426 may also be available for integration into tenant-developed virtual applications 428. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 426 such as "account" objects, "opportunity" objects, "contact" objects, or the like. The data 432 associated with each virtual application 428 is provided to the database 430, as appropriate, and stored until it is requested or is otherwise needed, along with the metadata 438 that describes the particular features (e.g., reports, tables, functions, objects, fields, formulas, code, etc.) of that particular virtual application 428. For example, a virtual application 428 may include a number of objects 426 accessible to a tenant, wherein for each object 426 accessible to the tenant, information pertaining to its object type along with values for various fields associated with that respective object type are maintained as metadata 138 in the database 130. In this regard, the object type defines the structure (e.g., the formatting, functions and other constructs) of each respective object 426 and the various fields associated therewith.

Still referring to FIG. 7, the data and services provided by the server 402 can be retrieved using any sort of personal computer, mobile telephone, tablet or other network-enabled client device 440 on the network 445. In an exemplary embodiment, the client device 440 includes a display device, such as a monitor, screen, or another conventional electronic display capable of graphically presenting data and/or information retrieved from the multi-tenant database 430. Typically, the user operates a conventional browser application or other client program 442 executed by the client device 440 to contact the server 402 via the network 445 using a networking protocol, such as the hypertext transport protocol (HTTP) or the like. The user typically authenticates his or her identity to the server 402 to obtain a session identifier ("SessionID") that identifies the user in subsequent communications with the server 402. When the identified user requests access to a virtual application 428, the runtime application generator 420 suitably creates the application at run time based upon the metadata 438, as appropriate. As noted above, the virtual application 428 may contain Java, ActiveX, or other content that can be presented using conventional client software running on the client device 440; other embodiments may simply provide dynamic web or other content that can be presented and viewed by the user, as desired.

The multi-tenant database 430 is any sort of repository or other data storage system capable of storing and managing the data 432 associated with any number of tenants. The database 430 may be implemented using any type of conventional database server hardware. In various embodiments, the database 430 shares processing hardware 404 with the server 402. In other embodiments, the database 430 is implemented using separate physical and/or virtual database server hardware that communicates with the server 402 to perform the various functions described herein. In an exemplary embodiment, the database 430 includes a database management system or other equivalent software capable of determining an optimal query plan for retrieving and providing a particular subset of the data 432 to an instance of virtual application 428 in response to a query initiated or otherwise provided by a virtual application 428. The multi-tenant database 430 may alternatively be referred to herein as an on-demand database, in that the multi-tenant database 430 provides (or is available to provide) data at run-time to on-demand virtual applications 428 generated by the application platform 410.

In practice, the data 432 may be organized and formatted in any manner to support the application platform 410. In various embodiments, the data 432 is suitably organized into a relatively small number of large data tables to maintain a semi-amorphous "heap"-type format. The data 432 can then be organized as needed for a particular virtual application 428. For example, conventional data relationships can be established using any number of pivot tables 434 that establish indexing, uniqueness, relationships between entities, and/or other aspects of conventional database organization as desired. Further data manipulation and report formatting is generally performed at run-time using a variety of metadata constructs. Metadata within a universal data directory (UDD) 436, for example, can be used to describe any number of forms, reports, workflows, user access privileges, business logic and other constructs that are common to multiple tenants. Tenant-specific formatting, functions and other constructs may be maintained as tenant-specific metadata 438 for each tenant, as desired. Rather than forcing the data 432 into an inflexible global structure that is common to all tenants and applications, the database 430 is organized to be relatively amorphous, with the pivot tables 434 and the metadata 438 providing additional structure on an as-needed basis. To that end, the application platform 410 suitably uses the pivot tables 134 and/or the metadata 438 to generate "virtual" components of the virtual applications 428 to logically obtain, process, and present the relatively amorphous data 432 from the database 430.

The data management system 10 disclosed herein provides for methods, systems, and techniques for processing the data 432 and related metadata in order to generate suggestions in an automated manner. In various embodiments, the suggestions are related to the creation of the pivot tables 434 and/or other table operations. The data management system 10 may be implemented as part of one of the virtual applications 428 and/or part of the data processing engine 412.

Disclosed herein are systems and methods for;' providing suggestions of related columns for a table operation in a data management system. The apparatus, systems, techniques and articles described can provide suggestions of related columns and/or suggestions of table operations that can be performed on the related columns.

In one embodiment, a computer implemented method of providing suggestions of related columns for a table operation in a data management system is provided. The method includes storing, by a processor, a table having a plurality of rows and a plurality of columns, metadata associated with the plurality of columns, and data stored within the plurality of rows and the plurality of columns; receiving, by a processor, a table operation selected by a system or a user; processing, by a processor, at least one of the data stored in the plurality of columns and the metadata associated with plurality columns based on a type of the selected table operation to determine at least one relationship between at least two columns of the plurality of columns; and generating, by the processor, dialog data that presents the at least one relationship between the at least two columns to a system or user for use in the table operation.

These aspects and other embodiments may include one or more of the following features. The method may include determining other table operations that can be performed based on the at least one relationship and the dialog data presents the other table operations.

The metadata may include at least one of a name of each column, a data type of each column, and a size of each column and wherein the processing is performed on the metadata. The processing may be based on at least one of an average, a median, a min-max, a data histogram, frequent values, and data completeness of the data stored in the plurality of columns, and the processing may be performed on the data stored in the plurality of columns.

The selected table operation may be a pivot operation. The selected table operation may be a join operation, a merge operation, and an append operation. The processing may be based on a relationship determination method, and the relationship determination method may be selected based on the type of the table operation. The processing may be based on a relationship determination method, the relationship determination method may compute a relationship score between the at least two columns, the at least one relationship may be determined based on a comparison of the relationship score to a defined threshold.

The processing may be based on a relationship determination method, and the relationship determination method may be a rule based determination method. The processing may be based on a relationship determination method, and the relationship determination method may be a rule based method that makes use of at least one of predefined rule sets and automatic rule inference.

In another embodiment, a computer-implemented system is provided. The system includes a non-transitory computer readable medium configured to store, by a processor, a table having a plurality of rows and a plurality of columns, metadata associated with the plurality of columns, and data stored within the plurality of rows and the plurality of columns; and a processor configured to receive a table operation selected by a system or a user, process at least one of the data stored in the plurality of columns and the metadata associated with plurality columns based on a type of the selected table operation to determine at least one relationship between at least two columns of the plurality of columns, and generate dialog data that presents the at least one relationship between the at least two columns to a system or user for use in the table operation.

These aspects and other embodiments may include one or more of the following features. The processor may be further configured to determine other table operations that can be performed on the at least one relationship and wherein the dialog data presents the other table operations. The metadata may include at least one of a name of each column, a data type of each column, and a size of each column and the processor may be further configured to process the metadata.

The processor may be configured to process based on at least one of an average, a median, a min-max, a data histogram, frequent values, and data completeness of the data stored in the plurality of columns, and the processor may be configured to process the data stored in the plurality of columns.

The table operation may be at least one of a pivot operation, a join operation, a merge operation, and an append operation. The processor may be further configured to process based on a relationship determination method, and the relationship determination method may be selected based on the type of the table operation. The relationship determination method may compute a relationship score between the at least two columns, the at least one relationship may be determined based on a comparison of the relationship score to a defined threshold. The relationship determination method may be a rule based determination method. The relationship determination method may be a rule based method that makes use of at least one of pre-defined rule sets and automatic rule inference.

In another embodiment, a multi-tenants system is provided. The multi-tenant system comprises one or more processors and non-transient computer readable media coupled to the one or more processors wherein the non-transient computer readable media embodies programming instructions configurable to perform a method. The method includes: storing, by a processor, a table having a plurality of rows and a plurality of columns, metadata associated with the plurality of columns, and data stored within the plurality of rows and the plurality of columns; receiving, by a processor, a table operation selected by a system or user; processing, by a processor, at least one of the data stored in the plurality of columns and the metadata associated with plurality columns based on a type of the selected table operation to determine at least one relationship between at least two columns of the plurality of columns; and generating, by the processor, dialog data that presents the at least one relationship between the at least two columns to a system or user for use in the table operation.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to object models, web pages, multi-tenancy, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A computer implemented method of providing suggestions of related columns for a table operation in a data management system, the method comprising:
    storing, by a processor, a table having a plurality of rows and a plurality of columns, metadata associated with the plurality of columns, and data stored within the plurality of rows and the plurality of columns, wherein the metadata includes at least one of a data type of each column, or a size of each column;
    receiving a table operation selected by a system or user;
    processing, by a processor, the metadata associated with the plurality of columns based on a type of the selected table operation to determine at least one relationship between at least two columns of the plurality of columns of the table, wherein the processing comprises selecting a relationship determination method from a plurality of relationship determination methods based on the type of the selected table operation, computing a similarity score between the at least two columns based on the metadata and the selected relationship determination method, and determining the at least one relationship based on a comparison of the similarity score to a threshold; and generating, by the processor, dialog data that presents the at least one relationship between the at least two columns to a system or user for use in the table operation.

2. The method of claim 1, further comprising determining other table operations that can be performed on the at least one relationship and wherein the dialog data presents the other table operations.

3. The method of claim 1, wherein the processing is based on at least one of an average, a median, a min-max, a data histogram, frequent values, and data completeness of the data stored in the plurality of columns, and wherein the processing is performed on the data stored in the plurality of columns.

4. The method of claim 1, wherein the table operation is a pivot operation.

5. The method of claim 1, wherein the table operation is at least one of a pivot operation, a join operation, a merge operation, and an append operation.

6. The method of claim 1, wherein the relationship determination method is selected based on the type of the selected table operation.

7. The method of claim 1, wherein the relationship determination method is a rule based determination method.

8. The method of claim 1, wherein the relationship determination method is a rule based method that makes use of at least one of predefined rule sets and automatic rule inference.

9. A computer implemented system of providing suggestions of related columns for a table operation in a data management system, the system comprising:

a non-transitory computer readable medium configured to store, by a processor, a table having a plurality of rows and a plurality of columns, metadata associated with the plurality of columns, and data stored within the plurality of rows and the plurality of columns, wherein the metadata includes at least one of a data type of each column, or a size of each column;

a processor configured to receive a table operation selected by a system or user, process the metadata associated with plurality columns based on a type of the selected table operation to determine at least one relationship between at least two columns of the plurality of columns of the table, wherein the processing comprises selecting a relationship determination method from a plurality of relationship determination methods based on the type of the selected table operation, computing a similarity score between the at least two columns based on the metadata and the selected relationship determination method, and determining the at least one relationship based on a comparison of the similarity score to a threshold, and generate dialog data that presents the at least one relationship between the at least two columns to a system or user for use in the table operation.

10. The system of claim 9, wherein the processor is further configured to determine other table operations that can be performed on the at least one relationship and wherein the dialog data presents the other table operations.

11. The system of claim 9, wherein the processor is configured to process based on at least one of an average, a median, a min-max, a data histogram, frequent values, and data completeness of the data stored in the plurality of columns, and wherein the processor is configured to process the data stored in the plurality of columns.

12. The system of claim 9, wherein the table operation is at least one of a pivot operation, a join operation, a merge operation, and an append operation.

13. The system of claim 12, wherein the relationship determination method is selected based on the type of the selected table operation.

14. The system of claim 9, wherein the relationship determination method is a rule based determination method.

15. The system of claim 9, wherein the relationship determination method is a rule based method that makes use of at least one of predefined rule sets and automatic rule inference.

16. An enterprise social networking system comprising one or more processors and non-transient computer readable media coupled to the one or more processors, the non-transient computer readable media embodying programming instructions configurable to perform a method, the method comprising:

storing, by a processor, a table having a plurality of rows and a plurality of columns, metadata associated with the plurality of columns, and data stored within the plurality of rows and the plurality of columns, wherein the metadata includes at least one of a data type of each column, or a size of each column;

receiving, by a processor, a table operation selected by a system or a user;

processing, by a processor, the metadata associated with plurality columns based on a type of the selected table operation to determine at least one relationship between at least two columns of the plurality of columns of the table, wherein the processing comprises selecting a relationship determination method from a plurality of relationship determination methods based on the type of the selected table operation, computing a similarity score between the at least two columns based on the metadata and the selected relationship determination method, and determining the at least one relationship based on a comparison of the similarity score to a threshold; and generating, by the processor, dialog data that presents the at least one relationship between the at least two columns to a system or user for use in the table operation.

* * * * *